United States Patent [19]
Freise et al.

[11] Patent Number: 5,927,452
[45] Date of Patent: Jul. 27, 1999

[54] ARRANGEMENT FOR COMPENSATING ALTERNATING TORQUES AND VIBRATIONS IN A MOTOR VEHICLE DRIVE TRAIN

[75] Inventors: Werner Freise, Kaiserslautern; Andreas Rundkowski, Braunschweig; Rainer Miersch, Rühen; Stefan Herzig, Calberlah, all of Germany

[73] Assignee: Volkswagen AG, Wolfsburg, Germany

[21] Appl. No.: 09/019,286

[22] Filed: Feb. 5, 1998

[30] Foreign Application Priority Data

Feb. 8, 1997 [DE] Germany ............... 197 04 786

[51] Int. Cl.⁶ ............... F16D 3/12; F16D 21/00; F02N 11/04; F16F 15/10
[52] U.S. Cl. ............... 192/3.52; 192/48.8; 192/55.61; 74/7 C; 74/574; 180/165; 310/74; 290/46
[58] Field of Search ............... 192/3.52, 48.1, 192/48.8, 55.61, 70.17; 475/5; 74/7 C, 7 E, 574; 310/74, 153; 180/165, 65.2, 65.4, 65.6; 290/38 R, 38 B, 46

[56] References Cited

U.S. PATENT DOCUMENTS

| | | | |
|---|---|---|---|
| 4,346,773 | 8/1982 | Hofbauer et al. | 192/48.8 X |
| 4,550,280 | 10/1985 | Freise | 318/701 |
| 4,584,513 | 4/1986 | Freise et al. | 318/701 |
| 4,626,696 | 12/1986 | Maucher et al. | 180/165 X |
| 4,894,570 | 1/1990 | Kaneyuki | 74/7 C X |
| 4,918,323 | 4/1990 | Aso | 74/7 C X |
| 5,126,582 | 6/1992 | Sugiyama | 74/7 E X |
| 5,536,208 | 7/1996 | Krumm | 464/68 |
| 5,570,615 | 11/1996 | Westphal et al. | 74/574 |

FOREIGN PATENT DOCUMENTS 3720559 1/1988 Germany.

*Primary Examiner*—Richard M. Lorence
*Attorney, Agent, or Firm*—Baker & Botts, L.L.P.

[57] ABSTRACT

An arrangement for compensating for alternating torques and reducing vibrations in the drive train of a motor vehicle includes three flywheel masses and two clutches in a common housing and integrates an electromechanical converter capable of being operated as an electric motor and as an generator. The first two flywheel masses are arranged in the manner of a dual-mass flywheel for the purpose of reducing the vibrations capable of being transmitted into the transmission by the crankshaft and the third flywheel mass is driven from the first flywheel mass through planet wheels so that it rotates in the direction opposite to the direction of rotation of the crankshaft. The third flywheel mass is formed, on its radially outer circumference as a rotor for an electromechanical converter and can be disconnected from the crankshaft by a clutch positioned between the planet wheels and the second flywheel mass while the other clutch serves as driving clutch.

16 Claims, 1 Drawing Sheet

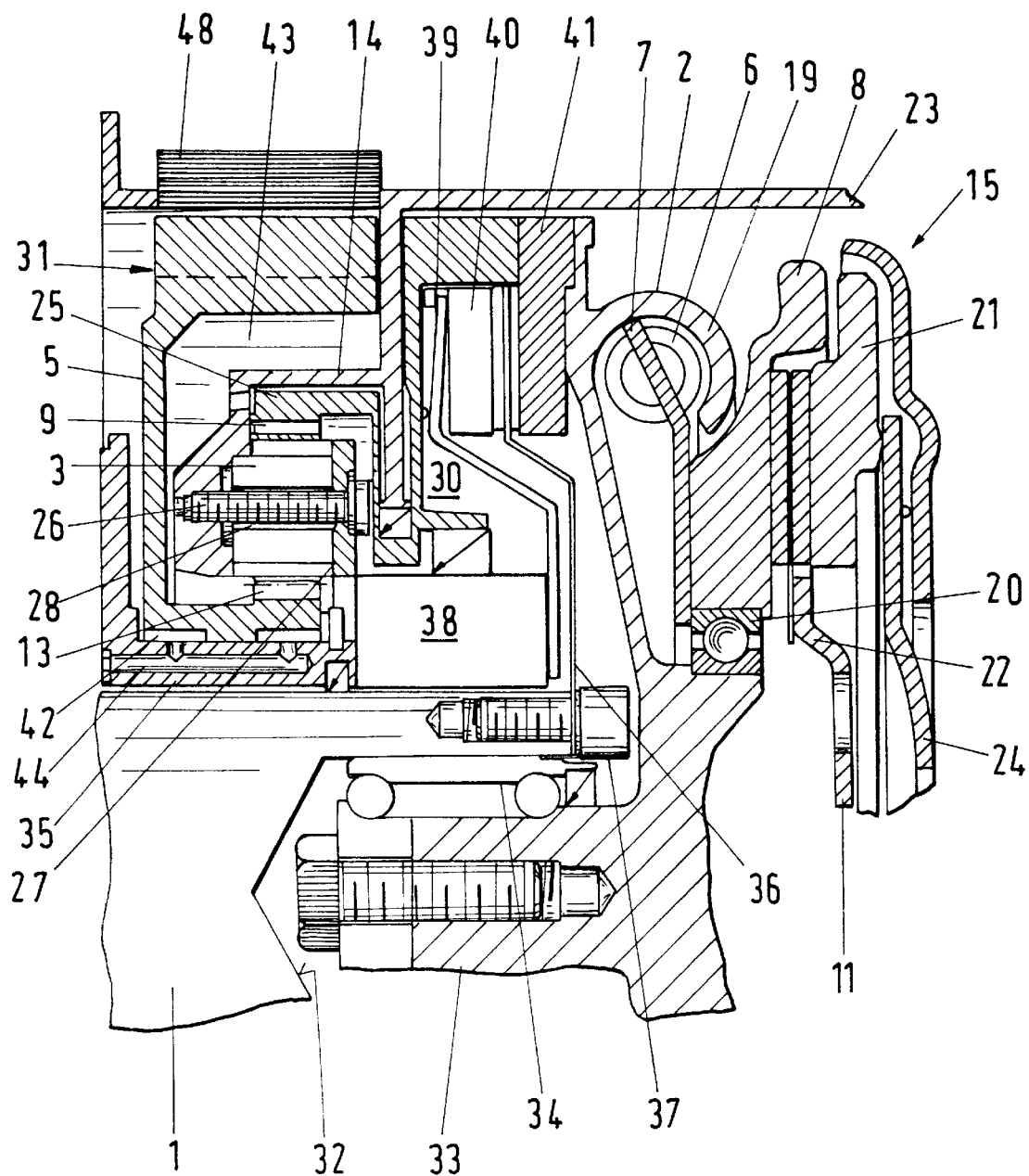

ARRANGEMENT FOR COMPENSATING ALTERNATING TORQUES AND VIBRATIONS IN A MOTOR VEHICLE DRIVE TRAIN

BACKGROUND OF THE INVENTION

This invention relates to arrangements for compensating alternating torques and vibrations in the drive train of a motor vehicle.

German Offenlegungsschrifft No. 37 20 559 discloses an arrangement for compensating alternating torques in a reciprocating piston internal combustion engine. In order to compensate alternating torques generated about the longitudinal axis of the crankshaft of the internal combustion engine by gas forces or reciprocating piston mass forces, that arrangement has a crankshaft connected on the drive side to planet carriers which support planet wheels having teeth which engage internal toothing of a planetary gear housing. The compensating mass for the alternating torques applied to the crankshaft is provided by the planet wheels which, because their carrier is driven by the crankshaft, rotate in a direction opposite direction to the rotation of the crankshaft, the ratio of the rotational motion of the planet carrier to the crankshaft rotation being constant. The necessary compensation for alternating torques in an internal combustion engine is thereby provided in an advantageous way and without requiring an additional balancing shaft.

U.S. Pat. No. 5,536,208 discloses a so-called dual-mass flywheel for the damping of vibrations in the drive train of a motor vehicle. This dual-mass flywheel is arranged in a conventional manner between the crankshaft of an internal combustion engine and a transmission. In this arrangement, a first flywheel mass of the dual-mass is fixedly connected to the crankshaft of the internal combustion engine, and a second flywheel mass is coupled to the input shaft of the transmission through a clutch which is preferably a friction clutch. A spring damping device, positioned between the two flywheel masses, connects the two flywheel masses to each other in such a way that relative angular motion between the two flywheel masses is possible.

Moreover, U.S. Pat. No. 5,570,605 discloses a device for the compensation of alternating torques and vibrations in a vehicle drive train in which a dual-mass flywheel has a planetary transmission for rotating a third flywheel mass in the opposite direction.

Finally, U.S. Pat. Nos. 4,550,280 and 4,584,513 disclose an electromechanical converter, known as a starter generator, in which a coilless rotor can be connected through a disconnecting clutch to the crankshaft of an internal combustion engine and also to the input shaft of a transmission. The rotor of the electromechanical converter is surrounded by one or more stators, the windings of which are connected through a voltage regulating device to the motor vehicle battery or to other electrical components of the motor vehicle. Depending on the respective operating situation, the electromechanical converter can be used as a stator for starting the internal combustion engine or as a generator for charging the vehicle battery or for supplying electricity to the electrical system of the vehicle.

SUMMARY OF THE INVENTION

Accordingly, it is an object of the present invention to provide an arrangement for compensating alternating torques in the drive train of a motor vehicle which overcomes the disadvantages of the prior art.

Another object of the invention is to provide an arrangement for compensating alternating torques and vibrations in a motor vehicle drive train having a particularly short design and which is also capable of being operated as an electromagnetic converter.

These and other objects of the invention are attained by providing a dual-mass flywheel between an internal combustion engine and a transmission in which a first flywheel mass of the dual-mass flywheel includes an integrated starting clutch and a planetary rotation compensating device and having a second clutch between the first flywheel mass and the compensating device by which the planetary transmission and a third rotary mass driven by the planet wheels and a rotor of an electromechanical converter which can be connected to the crankshaft of an internal combustion engine.

Preferably, one of the two flywheel masses of the dual-mass flywheel has a clutch thrust plate for the second clutch which acts as a crankshaft clutch and has a ring gear extension with internal teeth which mesh with the teeth of the planet wheels of the planetary rotation compensation device.

In addition, an actuating device for a disengaging cup spring of the second clutch may be disposed between the planet wheels and the clutch disk which is connected to the driven shaft of the internal combustion engine.

Finally, a lubricating oil supply line having outflow orifices for generating a lubricating film mist in the region of the bearings of the third flywheel mass may also be provided.

BRIEF DESCRIPTION OF THE DRAWINGS

Further objects and advantages of the invention will be apparent from a reading of the following description in conjunction with the accompanying drawing which is a longitudinal sectional view illustrating a representative embodiment of an alternating torque compensating arrangement according to the invention.

DESCRIPTION OF PREFERRED EMBODIMENTS

In the typical embodiment of the invention shown in the drawings, three flywheel masses 2, 5 and 8 are provided in a common housing 23. This embodiment also includes a first clutch 15, which may be used as a starting clutch, and a second clutch 30 constituting a crankshaft clutch, by which the third flywheel mass 5, which incorporates a rotor 31 for an electromechanical converter, can be disconnected from the drive train.

A crankshaft 1 of an internal combustion engine projects into the housing 23 and has an end bore 32 into which a short shaft portion 33 is inserted which is rotationally supported therein coaxially with respect to the crankshaft 1 by bearings 34. The shaft portion 33 supports and forms part of the first flywheel mass 2 which includes a spring reception device 19 in which at least one spring 6 of a tangentially acting spring damping system is received in a conventional manner. The spring 6 is supported on the first flywheel mass 2 and is connected to a web plate 7 to provide a resilient connection with the second flywheel mass 8. The second flywheel mass 8 contains a starting clutch 15 and is rotatably supported on the shaft portion 33 by a bearing 20.

In addition, the starting clutch 15 includes a cup spring 24, a clutch thrust body 21 and a clutch disk 22 which is connected by a flange 11 to a transmission input shaft (not illustrated).

On the crankshaft side, the first flywheel mass 2 has a ring gear 25 which is provided with internal teeth 9 which mesh with the teeth of a plurality of planet wheels 3. Each of the planet wheels 3 is supported by a planet bearing 28 on a planet wheel axle 26 mounted at one end in a web 14 which is affixed to the housing and supported at the other end in a bearing support 27. The teeth of the planet wheels 3 also engage a sun wheel rim gear 13 formed in the third flywheel mass 5 and extending radially outwardly away from the crankshaft 1. The third flywheel mass 5 is rotatably supported by a bearing 42 on a housing web 35 and includes on its outer circumference the rotor 31 of an electromechanical converter. A lubricant supply line 44 has outlets which open into a space 43 in the region of the bearings 42. As seen in the drawing, stators 48 for the electronic converter are mounted on or in the housing 23 in the region radially outside the rotor 31. Since the third flywheel mass 5 is driven through the planet wheels 3 from the first flywheel mass 2, the third flywheel mass 5 rotates in a direction which is opposite to the direction of rotation of the crankshaft 1. The rotational torque irregularities of the crankshaft relative to the engine housing are thereby very well compensated in a conventional manner and in a particularly space-saving configuration.

The electromechanical converter consisting of the rotor 31 and the stator 48 may be used as a motor for driving the flywheel mass 5 and also the flywheel masses 2 and 8 through the planetary drive. By rapid closing of the crankshaft clutch 30, the internal combustion engine can be started from the kinetic energy of the flywheels, thereby providing a starter function for the electromagnetic converter. If the electromagnetic converter has sufficient power, an electric drive mode is also possible by energizing the stator 48 with the starting clutch closed.

When the internal combustion engine is running, the crankshaft clutch 30 is always closed and the flywheel masses are rotating. Consequently, the electromagnetic converter then serves as a generator for battery charging or for supplying power to the electrical system of the vehicle. Moreover, the electromechanical converter can also act as a generator when the internal combustion engine is turned off and the crankshaft clutch 30 is opened, if the clutch 15 is likewise opened by utilizing the kinetic energy of the flywheels or, if the clutch 15 is closed, by utilizing the kinetic energy or braking energy of the entire vehicle.

The clutch 30, which includes a portion 41 of the first flywheel mass 2 constituting a clutch plate and a clutch disk 36 connected to the crankshaft 1 by bolts 37, is actuated by a central clutch actuating unit 38. This unit is illustrated in the drawings as a functional block and is preferably operated by a pressure medium in response to signals from a conventional control unit, not illustrated. In this case, the clutch actuating unit 38 acts on the cup spring 39 to release a clutch thrust body 40 to open the clutch 30.

By virtue of this extremely compact design of the alternating torque compensating arrangement, the invention can advantageously be employed especially in small and fuel-saving internal combustion engines, for example three-cylinder reciprocating internal combustion engines.

Although the invention has been described herein with reference to specific embodiments, many modifications and variations therein will readily occur to those skilled in the art. Accordingly, all such variations and modifications are included within the intended scope of the invention.

We claim:

1. An arrangement for compensating alternating torques and vibrations in the drive train of a motor vehicle comprising:

a first flywheel mass which can be connected to a crankshaft of an internal combustion engine;

a second flywheel mass which can be connected through a first clutch to the input shaft of a transmission;

a spring damping device connecting the first and second flywheel masses to each other while permitting relative motion between them;

a third flywheel mass which is driven from the first flywheel mass by a planetary transmission;

a second clutch operationally positioned between the planetary transmission and the first flywheel mass for connecting the first flywheel mass to the crankshaft; and a rotor for an electromechanical converter on a radially outer circumference of the third flywheel mass.

2. An arrangement according to claim 1 including a housing and wherein the first flywheel mass includes a ring gear with internal teeth which engage teeth of planet wheels of the planetary transmission which are mounted in fixed relation to the housing.

3. An arrangement according to claim 1 wherein teeth of planet wheels of the planetary transmission engage a rim gear of the third flywheel mass which constitutes a sun gear.

4. An arrangement according to claim 1 including a housing and wherein the planet wheels are mounted on a housing web.

5. An arrangement according to claim 1 wherein the first flywheel mass includes a portion forming a clutch thrust plate.

6. An arrangement according to claim 1 including the second clutch constituting a starting clutch in the region of the second flywheel mass.

7. An arrangement according to claim 1 including a device on the first flywheel mass for receiving at least one spring for connecting the first flywheel mass to the second flywheel mass in a tangentially resilient manner.

8. An arrangement according to claim 7 wherein the spring is connected to a web plate which is fastened to the second flywheel mass.

9. An arrangement according to claim 1 wherein the second flywheel mass includes a clutch thrust plate and is supported by a bearing on a shaft portion.

10. An arrangement according to claim 1 including a clutch disk disposed between a clutch thrust plate of the second flywheel mass and a clutch thrust body which can be connected to a transmission input shaft.

11. An arrangement according to claim 1 wherein the clutch disk of the first clutch is connected to the crankshaft.

12. An arrangement according to claim 1 including an actuating device for the first clutch operationally positioned between planet wheels of the planetary transmission and a clutch disk of the first clutch.

13. An arrangement according to claim 1 wherein the first flywheel mass is connected to a shaft portion which is mounted coaxially in a bore of the crankshaft.

14. An arrangement according to claim 1 including a housing and wherein the third flywheel mass is rotatably supported on a housing web.

15. An arrangement according to claim 14 including a lubricant supply line opening into a space for the planetary transmission in the region of a bearing for the third flywheel mass.

16. An arrangement according to claim 1 including a drive train comprising:

a reciprocating internal combustion engine; and a transmission operationally coupled to the arrangement for compensating alternating torques and vibrations.

* * * * *